(12) United States Patent
Ruckriemen et al.

(10) Patent No.: US 11,133,943 B2
(45) Date of Patent: Sep. 28, 2021

(54) ISSUING VIRTUAL DOCUMENTS IN A BLOCK CHAIN

(71) Applicant: Bundesdruckerei GMBH, Berlin (DE)

(72) Inventors: Jorg Ruckriemen, Berlin (DE); Jens Ehreke, Berlin (DE)

(73) Assignee: BUNDESDRUCKEREI GMBH KOMMANDANTENSTRASSE 18, Berlin (DE)

( * ) Notice: Subject to any disclaimer, the term of this patent is extended or adjusted under 35 U.S.C. 154(b) by 190 days.

(21) Appl. No.: 16/494,381

(22) PCT Filed: Mar. 16, 2018

(86) PCT No.: PCT/EP2018/056619
§ 371 (c)(1),
(2) Date: Sep. 16, 2019

(87) PCT Pub. No.: WO2018/167252
PCT Pub. Date: Sep. 20, 2018

(65) Prior Publication Data
US 2020/0244470 A1    Jul. 30, 2020

(30) Foreign Application Priority Data

Mar. 17, 2017  (DE) .................... 10 2017 204 536.1

(51) Int. Cl.
*H04L 29/06* (2006.01)
*H04L 9/32* (2006.01)
(Continued)

(52) U.S. Cl.
CPC .......... *H04L 9/3297* (2013.01); *G06Q 50/18* (2013.01); *H04L 9/0825* (2013.01); *H04L 9/30* (2013.01);
(Continued)

(58) Field of Classification Search
CPC ....... H04L 9/3297; H04L 9/0825; H04L 9/30; H04L 9/3226; H04L 9/3236;
(Continued)

(56) References Cited

U.S. PATENT DOCUMENTS

2016/0033035 A1* 2/2016 Sriram .................... B22F 5/106
                                                    419/38
2016/0212146 A1* 7/2016 Wilson .................. H04L 9/3226
(Continued)

FOREIGN PATENT DOCUMENTS

| CN | 106412037 A | 2/2017 |
| GB | 2539430 A | 12/2016 |
| WO | WO-2016170538 A1 | 10/2016 |

OTHER PUBLICATIONS

International Preliminary Report on Patentability for corresponding PCT Application. PCT/EP2018/056619 dated Sep. 26, 2019.
(Continued)

*Primary Examiner* — Mahfuzur Rahman
(74) *Attorney, Agent, or Firm* — Harness, Dickey & Pierce, P.L.C.

(57) ABSTRACT

A method for issuing a virtual document by a first computer system of an issuer, includes creating the virtual document; calculating a hash value of the virtual document; sending a signed entry request including the hash value to a blockchain server; receiving the signed entry request by the blockchain server; and executing, by the blockchain server, program instructions of a program module identified by the signed entry request, wherein the execution of the program instructions includes checking the signature of the entry request, using a public cryptographic key of the issuer registered in the blockchain, and, if the signature is valid, generating an additional block of the blockchain for the issue of the virtual document, wherein the generated block includes an entry
(Continued)

associated with the program module and including the first hash value.

19 Claims, 9 Drawing Sheets

(51) Int. Cl.
*G06Q 50/18* (2012.01)
*H04L 9/08* (2006.01)
*H04L 9/30* (2006.01)

(52) U.S. Cl.
CPC .......... *H04L 9/3226* (2013.01); *H04L 9/3236* (2013.01); *H04L 9/3247* (2013.01); *G06Q 2220/00* (2013.01); *H04L 2209/38* (2013.01)

(58) Field of Classification Search
CPC ... H04L 9/3247; H04L 2209/38; H04L 63/12; G06Q 50/18; G06Q 2220/00; G06Q 30/018; G06F 21/645
See application file for complete search history.

(56) References Cited

U.S. PATENT DOCUMENTS

| | | | |
|---|---|---|---|
| 2016/0261685 A1* | 9/2016 | Chen | H04L 41/28 |
| 2017/0033932 A1* | 2/2017 | Truu | H04L 9/3239 |
| 2019/0303887 A1* | 10/2019 | Wright | G06Q 20/0658 |
| 2019/0386969 A1* | 12/2019 | Verzun | H04L 63/102 |
| 2020/0145219 A1* | 5/2020 | Sebastian | H04L 9/3236 |

OTHER PUBLICATIONS

International Search Report PCT/ISA/210 for International Application No. PCT/EP2018/056619 dated Mar. 16, 2018.
Written Opinion of the International Searching Authority PCT/ISA/237 for International Application No. PCT/EP2018/056619 dated Mar. 16, 2018.
Andreas Antonopoulos, *Mastering Bitcoin*, Chapter 7: The Blockchain, p. 161, Dec. 2014.
Bergmann, Christoph: "Notare und Banken, Ausweise und Börsen," in Bitcoinblog, Dec. 8, 2015, URL: https://bitcoinblog.de/2015/12/08/notareund-banken-ausweise-und-boersen.
"Does notarization on the blockchain actually work?" In Decentralize today, Jan. 25, 2017, URL: https://decentralize.today/does-notarization-on-theblockchain-actually-work-d8006443cOb9.
Crosby, M. et al.: "Blockchain Technology, Beyond Bitcoin," in Sutardja Center for Entrepreneurship & Technology, Technical Report, Oct. 16, 2015, URL: https://pdfs.semanticscholar.org/4b65/d3eda63fcl8303dfbc071fe ceOe276a7a 16c.pdf.
Satoshi Nakamoto, "Bitcoin: Peer-to-Peer Electronic Cash System," (https://bitcoin.org/bitcoin.pdf).
David Schwartz et al., "The Ripple Protocol Consensus Algorithm," Ripple Labs Inc., 2014, https://ripple.com/files/ripple_consensus_whitepaper.pdf.

* cited by examiner

ISSUING VIRTUAL DOCUMENTS IN A BLOCK CHAIN

CROSS-REFERENCE TO RELATED APPLICATIONS

This application is a national phase under 35 U.S.C. § 371 of PCT International Application No. PCT/EP2018/056619 which has an International filing date of Mar. 16, 2018, which claims priority to German patent application number DE 10 2017 204 536.1 filed Mar. 17, 2017.

DESCRIPTION

The invention relates to a method for issuing a virtual document in a blockchain and to a system for carrying out the method.

Documents, such as credentials, usually comprise a document body, for example made of paper, on which they are issued and can be easily forged using modern image processing programs and color printers. In particular, the problem of a lack of protection against forgery arises when additional official copies, such as true copies, duplicates and copies, are needed in addition to an original of the document. The authenticity thereof is usually verified by a notarization. An official notarization is an official certification of the accuracy of a true copy, duplicate, copy or the like of a document. A notarization is generally only based on a brief visual inspection and is not secure for this reason alone. Additionally, a notarization already fulfills the prescribed requirements when the attestation clause bears an official seal, such as a stamp, and the attestation clause was signed by the notarizing individual. An attestation clause encompasses the statement that the notarized true copy matches the presented original document. Moreover, the attestation clause may encompass an exact designation of the original document, the true copy/copy of which is being notarized. Such a notarization is likewise easy to forge using modern image processing programs.

While methods using a machine-readable imprinted seal in the form of a QR code increase security, these can be used, at the most, with one-sided documents containing few data due to the small scope of data that a QR code can include.

In addition, applying security features to document bodies, for example made of paper, is logistically inefficient. Blank sheets containing the corresponding security features, such as are also used, for example, for identification documents or bank notes, have to be physically distributed and protected against misuse or theft. Moreover, the costs for implementing the security features increase directly proportionally to the number of credential-related documents. A basic principle of the security features used is based on security being achieved by rendering it too costly, and thus economically unattractive, to exactly copy the security features. Finally, these security concepts cannot be applied to digital goods.

WO 2016/170 538 A1 describes a decentralized system and a method for managing electronic documents of title (EDTs). The method comprises: by an issuing node: generating a root unique object (RUO), which is associated with the issuing node and can be used as a pointer to a blockchain maintained in the DTDB, thereby initiating for a given EDT a possession chain that is characterized by an ID associated with the RUO (RUOID); and embedding into the given EDT a data object comprising information about the RUOID, and digitally signing the EDT with the embedded data object in a manner that enables an authorized node to verify the EDT and to extract the data object, thereby giving rise to a generated EDT; by each node currently in possession of the generated EDT: transferring possession of the generated EDT to a recipient node, which is the next node to become in possession of the generated EDT, the transferring of possession comprising: obtaining from the blockchain a first unique object generated by a node which has transferred EDT possession to the first node; using the first unique object to generate a second unique object which is indicative of the first unique object, specifies the recipient node and can be included in the blockchain; enabling including the generated next unique object into the blockchain; and forwarding the generated EDT to the recipient node via a digital medium; by each node, in response to receiving possession of the generated EDT: validating the received generated EDT; using RUO_ID embedded in the generated EDT to validate the possession chain; and transferring possession of the generated EDT to recipient node.

CN 106 412 037 A describes an electronic security file processing method based on a block link structure. The method comprises the following steps: a member node in a block link, consisting of a main node and at least one member node, creates a request for the generation of an electronic security file based on the occurrence of a trigger event, and sends the request for the generation of the electronic security file to the main node; the main node generates an electronic security file based on the received request for the generation of the electronic security file and transmits the generated electronic security file to the member node specified by the request for the generation of the electronic security file.

US 2016/0 212 146 A1 describes systems and methods which use a blockchain to enable the establishment of file dates and the absence of tampering, even for documents held in secrecy and those stored in uncontrolled environments, without requiring trust in a time-stamping authority or a document archival service. A trusted time-stamping authority (TTSA) can be used, but even when the TTSA loses its credibility or a challenger refuses to acknowledge the validity of a time stamp, a date can still be established for an electronic document. Systems and methods are described which allow file duplications to be detected in large document collections, whereby the search for documents within the large collection can be improved.

US 2017/0 033 932 A1 describes adding an identifier of an entity in a registration path to at least one node in a distributed hash tree-based verification structure A data signature containing parameters for recomputation of a verification value and associated with a digital input record thus also receives data identifying at least one entity in the hash three path which is used for its original registration in the infrastructure. An uppermost value of the hash tree-based verification infrastructure is entered into a blockchain as a transaction or as part of a transaction.

US 2016/0 330 035 A1 describes systems and methods for managing the identity of a user, for managing the identity of the user in a public storage facility, and for certifying pending transactions for a user. The method includes receiving, at an input device, personal data that identifies the user. The personal data is represented as input data. The input device is configured to process a hash function to provide a hash value and a user-accessible interface for transmitting the hash value and a public key of the user to the public storage facility, such as block chain, and for receiving back from the public storage facility a transaction number corresponding to the hash value and the public key. The input device is configured to encrypt the hash value, a time stamp and the transaction number with a public key of a certification entity to provide user-certifiable data to the certification entity. The certification entity is configured to access the public storage facility to verify the user.

BERGMANN, Christoph: "Notare und Banken, Ausweise und Börsen," in Bitcoinblog, Dec. 8, 2015. URL: https://bitcoinblog.de/2015/12/08/notareund-banken-ausweise-und-boersen, describes projects that apply the blockchain principle to different areas, namely notaries, banks, stock exchanges and identification. Identities are managed by a blockchain, identification data being stored in the blockchain using a Factom protocol, and a digital identification card being provided to the customer.

"Does notarization on the blockchain actually work?", in: Decentralize.today, Jan. 25, 2017. URL: https://decentralize.today/does-notarization-on-theblockchain-actually-work-d8006443cOb9, describes services describing a notarization of files using a blockchain.

CROSBY, M. et al.: "Blockchain Technology, Beyond Bitcoin", in: Sutardja Center for Entrepreneurship & Technology, Technical Report, Oct. 16, 2015. URL: https://pdfs.semanticscholar.org/4b65/d3eda63fc18303dfbc071fe ceOe276a7a 16c.pdf, is a whitepaper describing the blockchain technology and several specific applications in the financial and non-financial sectors.

In contrast, it is the object of the invention to create an efficient and secure method for issuing a virtual version of a document.

The object underlying the invention is achieved by the features of the independent claims. Embodiments of the invention are described in the dependent claims.

Embodiments comprise a method for issuing a virtual document by means of a first computer system of an issuer. The first computer system comprises a memory, in which a public cryptographic key of an asymmetric key pair associated with the issuer is stored. A private cryptographic key of the asymmetric key pair of the issuer is stored in a protected area of the memory. The first computer system further comprises a communication interface for communicating via a network.

The virtual document is issued using a blockchain. In a block, the blockchain comprises a program module including first and second program instructions. Entries associated with the program module are generated in the blockchain by the execution of the program instructions.

The method for issuing the virtual document comprises:
creating a registration request by the first computer system, wherein the registration request includes the public cryptographic key of the issuer and identifies the program module;
sending the registration request by the first computer system via the network to a first blockchain server, wherein the first blockchain server is configured to generate blocks of the blockchain;
receiving the registration request by the first blockchain server;
executing, by the first blockchain server, the first program instructions of the program module identified by the registration request, wherein the execution of the first program instructions comprises checking the validity of the registration request and, if the registration request is valid, generating a first additional block of the blockchain for the registration of the public cryptographic key of the issuer, wherein the generated first block comprises a first entry associated with the program module and including the public cryptographic key of the issuer.

The method further comprises:
receiving a request by the first computer system for the issue of a virtual document;
creating the virtual document by the first computer system;
calculating a first hash value of the virtual document by the first computer system;
creating, by the first computer system, an entry request signed with the private cryptographic key of the issuer, wherein the entry request includes the first hash value and identifies the program module;
sending the signed entry request by the first computer system via the network to a second blockchain server, which is configured to generate blocks of the blockchain;
receiving the signed entry request by the second blockchain server;
executing, by the second blockchain server, the second program instructions of the program module identified by the signed entry request, wherein the execution of the second program instructions comprises checking the signature of the entry request, using the public cryptographic key of the issuer registered in the blockchain, and, if the signature is valid, generating a second additional block of the blockchain for the issue of a virtual document, wherein the generated second block includes a second entry associated with the program module and including the first hash value.

Embodiments can have the advantage of allowing virtual documents, such as credentials or other files, to be issued or notarized securely. Issuing a virtual document here shall be understood to mean creating an electronic file, including all the data of the corresponding document, and proof of the authenticity of the corresponding data. According to embodiments, such proof of authenticity for a virtual document comprises a hash value of the corresponding virtual document which is entered into a blockchain. Securing a virtual document by a checksum based on a hash and storing a blockchain is an effective and secure process. In this way, in particular, forgeries can be efficiently prevented. The resulting cost hardly increases with the number of documents since the cost for securing the individual documents is already low. Additionally, embodiments can have the advantage that the authenticity of all copies of a document, once entered into the blockchain, can be confirmed by the blockchain. In this way, it is possible to notarize an unlimited number of copies by way of a single entry in the blockchain. As long as the copies are identical to the original document or the original file in terms of content, so that the hash value does not change, it is possible to verify based on the blockchain that a corresponding copy is in fact a faithful copy. In the case of conventional documents in paper form, for example, every single copy would have to be notarized. The method is suitable for all types of virtual documents, that is data objects or files. It is possible to secure documents of any arbitrary size or page count efficiently and in a disk space-saving manner. The method is easy to handle. Finally, a use of a blockchain of a cryptocurrency enables the implementation of an implicit fee system.

The resulting hash value of the document is stored so as to be permanently publicly accessible. According to embodiments, the hash value is entered into the blockchain together with a time stamp, so that the point in time at which the document was issued can be verified at any time. Notwithstanding the public accessibility of the hash value, the blockchain does not comprise any publicly accessible personal data of the document owner or other data included in the document. The personal data of the document owner as well as the document itself are solely within the control of the document owner or the document issuer. Only those who are in possession of the document are able to calculate the hash value thereof and check whether an identical hash value has been stored in the blockchain. If this is the case, the presented document is considered to be authentic. However, no information as to the type or content of the underlying document can be derived from the publicly accessible hash values of the blockchain.

According to embodiments, the entry in the blockchain including the hash value comprises a signature of the issuer of the document. For example, the transaction containing the hash value is signed with the private cryptographic key of the issuer. This signature can be checked with the associated public cryptographic key of the issuer. Since the public key of the issuer was made known, it can be verified that the document was, in fact, issued by an issuer authorized to do so. For example, in the case of a credential, it is possible to check whether the school in charge indeed issued the credential, that is, posted it to the blockchain.

For example, the entry in the blockchain describes a transaction from a starting address to a destination address, the starting address being an address of the issuer, such as a school, for example. This starting address can, for example, correspond to the public cryptographic key of the issuer, so that it is possible to verify the origin of the hash value in the blockchain. It is only possible to send data from this starting address which is signed with the associated private cryptographic key of the issuer. Upon entry in the blockchain, for example, the entry request identifies the corresponding starting address.

According to embodiments, a blockchain is provided for issuing and verifying virtual documents, such as credentials. If an issuer of documents, such as an authority, a university, a school, an institute or a private company, wants to use the blockchain, the issuer can become registered. For example, the issuer is authenticated in the course of the registration. As soon as the issuer is registered, that is, the public cryptographic key thereof is stored in the blockchain, the issuer can issue virtual documents and store the hash values thereof in the blockchain for the purpose of verification. This storage of the hash values in the blockchain corresponds to a notarization of the corresponding virtual documents and of all faithful copies thereof.

Embodiments can thus allow documents, such as credentials, to be issued in virtual form, either exclusively or in addition to being issued in paper form, as a data construct for electronic data processing. Such virtual documents can be stored and/or transported on arbitrary electronic devices comprising corresponding memories. However, these electronic devices should be protected against unauthorized access. For example, the documents can be stored in a protected memory area of the corresponding memory. Furthermore, the documents can be cryptographically secured, for example using a security module. Moreover, the virtual documents can be easily transmitted via electronic communication links, such as the Internet. The communication links used for transmission, however, should be protected against interception or tampering attempts by unauthorized third parties. Cryptographic securing can take place, for example, by encryption with a symmetric cryptographic key and/or a public cryptographic key associated with the recipient. According to embodiments, a transmission is carried out via a connection secured by means of end-to-end encryption. Furthermore, the transmission of the virtual document can be secured by means of suitable transport encryption, such as HTTPS.

If the owner of such a virtual document requires a copy for transmission, such as copies for an online application in the case of credentials, the owner can personally create these. As long as the copy is unaltered compared to the original, that is, has the same hash value, the resulting copy is already notarized by the hash value entered in the blockchain. The recipient of the corresponding copy can calculate the hash value thereof and check, based on the blockchain, whether an identical hash value is stored by an entity authorized to do so, that is, the issuer. For example, in the case of an online application, an applicant can transmit all the credentials in virtual form, and the recipient can have these checked automatically for the authenticity thereof by a computer system. In particular, such automation can be of advantage for large international companies receiving thousands of applications per month. Embodiments implement sufficiently high security standards, so that forgeries can be precluded. This can be of advantage, for example, for hospitals since it is possible to check, efficiently and effectively, whether an applicant is submitting falsified credentials, and in particular a falsified license to practice medicine. By using a central blockchain, the verification can be implemented in efficient form, for example, for all national and/or at least a selection of international universities offering recognized medical degree programs. Since the blockchain only includes hash values, and no personal data of the credential owner, additionally a high data protection standard is ensured.

According to embodiments, an entry is associated with the program module, for example, when it comprises an ID of the program module.

A "document" shall, in particular, be understood to mean a record, a credential or an identification, value or security document, in particular a document from a governing body, in particular a paper-based and/or plastic-based document, such as an electronic identification document, in particular a passport, an identification card, a visa, a driver's license, a vehicle registration, a vehicle title, a health insurance card or a company ID card, or another ID document, a chip card, a payment instrument, in particular a bank note, a bank card or a credit card, a bill of lading or other proof of authority. In particular, the document can be a machine-readable travel document, such as from the International Civil Aviation Organization (ICAO) and/or the German Federal Office for Information Security (BSI).

A "virtual" document shall be understood to mean a data construct for electronic data processing, which comprises the same data as an above-defined document, but no permanently associated physical document body. A virtual document, also referred to as an electronic document, can thus comprise text, a table of numbers, an image, or a sequence or combination of texts, tables or images, which were created as or translated into a file by digitization, that is, conversion into a binary code. In particular, the validity of such a document is independent from the existence of a permanently associated document body. A "virtual" document can be an electronic file of an arbitrary file format, and in particular a non-executable text or table file. Furthermore, a virtual document can, for example, also be a video file, a music file, program code, an executable file, an archive or the like.

According to embodiments, a virtual document can be created, for example, by generating a file containing the data of the corresponding document on a computer. Furthermore, a virtual document can, for example, also be created by scanning or photocopying a physical document, such as a document on paper. If a virtual document is issued using such a scan, however, ultimately only the virtual document in the form of the specific scanned file and all identical duplicates or copies of the specific scanned file are valid. A renewed scan of the same physical original document will generally result in a further scanned file, which has a different hash value due to minor variations during the scanning process. As a result, a hash value of a previously created scanned file of the same original document which has already been entered in the blockchain cannot provide proof of authenticity or validity for this further scanned file. Due to the use of hash values, however, according to the method described herein, the proof of authenticity or the validity of a virtual document is linked to an unaltered file.

A record is a declaration in text or written form which documents a particular statement of facts or presentation of facts. Moreover, the record can identify the issuer of the instrument. Credentials can, for example, encompass school or university certificates, certificates attesting to a successful participation in continuing education programs or courses, certificates attesting to the successful participation in a lecture, certificates of internships or employment references.

Credential can, for example, include a CCI certificate of examination, which is a record that is presented to those who have successfully completed the final examination before the Chamber of Commerce and Industry (CCI) in a recognized trade or advanced training program. For example, a CCI certificate includes information about the trade that was learned, that is, a job designation, and the final examination that was passed. The credential can appear in a standardized layout and contain the job designation as well as the specialty or main discipline. The overall result, including the score and grade points, is listed above the individual examination results. At the request of the tested individual, a grade from the vocational school may be listed beneath the individual examination results.

Furthermore, a document can, for example, also be a skilled worker's certificate, a journeyman certificate, a master craftsman certificate, a Bachelor's degree certificate, a Master's degree certificate, a diploma, a doctoral degree certificate or a license to practice medicine.

Here and hereafter, a "blockchain" shall be understood to mean an ordered data structure comprising a plurality of linked data blocks. In particular, a blockchain shall be understood to mean an ordered data structure in which each of the blocks (with the exception of the first block) comprises a check value, such as a hash value, of the prior block, and thus, based on each block, can check, and optionally confirm, the validity of all the prior blocks. For examples of a blockchain, see https://en.wikipedia.org/wiki/Block_chain_(database) and "Mastering Bitcoin," Chapter 7, The Blockchain, page 161 ff. The blockchain concept was described in 2008, for example, in a whitepaper under the pseudonym Satoshi Nakamoto with respect to Bitcoin ("Bitcoin: Peer-to-Peer Electronic Cash System" (https://bitcoin.org/bitcoin.pdf)). The blockchain described therein is composed of a number of data bocks, having combined therein one or more entries or transactions and being provided with a checksum in the form of a hash value. Additional blocks of the blockchain are generated, for example, in a computationally intensive process, which is also referred to as mining. These additionally generated blocks are then added to the blockchain and distributed via a network to all participants, or nodes of the network.

Embodiments can have the advantage that, by storing the cryptographic checksum, that is, hash values, of the prior block in the respective next block, the blockchain offers a high degree of security with respect to subsequent tampering. In a blockchain, the entries or transactions of a block are hashed in pairs in a Merkle tree, for example, and only the last hash value of the block thus obtained, the so-called root hash value, is included as the checksum, for example in a header of the block. The linking of the blocks can be checked by using these root hash values. Each block of the blockchain, in the header thereof, includes the hash of the entire prior block header. In this way, the sequence of blocks is clearly established, creating a chain structure. As a result of the linking of the individual blocks thus implemented, it is achieved that a subsequent alteration of prior blocks or individual transactions is practically precluded, since the hash values of all subsequent blocks would likewise have to be recomputed within a short time to do so.

The first block in the blockchain is predefined and referred to as the genesis block. According to embodiments, the public cryptographic keys of one or more providers authorized to create program modules are stored in the genesis block. Due to the above-described chain structure, the genesis block is the block having entries that offer the highest degree of security, since altering the same would require replacing the entire blockchain with a new blockchain. The entry of the public cryptographic key in the genesis block can thus represent a trust anchor offering a sufficient degree of security so that, for example, no additional PKI check is necessary to trust the authenticity of the public cryptographic key. In this way, the security of the system can be further enhanced in the offline mode.

Moreover, the security can be additionally enhanced by adapting the necessary computational intensity to the creation of respective additional blocks. The computational intensity needed to create additional blocks can be controlled by way of requirements with regard to the hash value of the additional block to be created. The resulting hash value is not predictable; rather, it is a randomly distributed number. However, it is possible to calculate how much time is needed, on a statistical average, to locate a valid additional block as a function of the expended computing power. For example, the hash value of a block can be varied by adding and varying a nonce. Due to the chain structure, it is no longer possible to alter or remove data, once stored in a blockchain, without replacing large parts of the blockchain. However, such a replacement is not an option due to a sufficiently computational intensive generation of additional blocks. Known embodiments of a blockchain, such as in the case of the cryptocurrency Bitcoin, are based on anonymity of the partners involved in the transactions. In contrast, the above-described signature of the hash values entered in the transactions can be used to verify the authenticity thereof and prove the origin thereof. In this way, the protection against forgery can be improved.

A requirement for a valid block may be, for example, that the hash value of the header of the block is less than or equal to a limit value. The hash value can be calculated, for example, using the Secure Hash Algorithm (SHA) SHA 256. The resulting hash value in this case is a random number between 0 and $2^{256}-1$. The likelihood that the application of the hash algorithm yields a particular hash is thus (maximum hash value+1)$^{-1}$, which in the case of the SHA 256 algorithm is thus $2^{-256}$. The likelihood that the resulting hash value is less than or equal to a limit value or target is thus (target)/(maximum hash value). For an exemplary maximum limit value of $(2^{16}-1)\cdot 2^{208}$, the likelihood is $[(2^{16}-1)\cdot 2^{208}]/$ $2^{256} \approx 2^{-32}$. The difficulty S of obtaining a hash value that is less than or equal to a selected limit value or target can be described as follows, as a function of a maximum limit value or maximum target: S=(max. target)/target. Consequently, the likelihood of obtaining a hash value that is less than or equal to the selected limit value for the above-described example is: $2^{-32}$/S. As an example, a computer system having a particular hash rate shall be considered, which, on average, finds a hash value that is less than or equal to the selected limit value every x seconds. If, instead of every x seconds, the computer, on average, is to find a match every y seconds, the difficulty can be accordingly adjusted: $S_y$= (x/y)·S. Corresponding adjustments in the difficulty can also be used to maintain the match rate at a constant level during changes of the computer system, for example changes in the computing power by an increase or decrease in the number of blockchain servers. If the difficulty is adjusted so that a match is achieved every y seconds, the hash rate R of the computer system can be parameterized as follows: R=($2^{32}$·S)/(y·sec.).

If valid blocks are generated by a computational intensive method, such as that described above, the participants of the blockchain network trust the longest valid blockchain, since this involves the highest computing power, and it can thus be assumed that this is recognized as being valid by the majority of the participants. If, for example, a fork, that is a divergence into two paths, occurs in the blockchain, the fork having the longer chain length will eventually prevail since it is to be assumed that this is backed by the majority of the participants.

A blockchain can also be implemented in the form of a private blockchain, for example, wherein only a selected group of participants has the authorization to add valid blocks. A corresponding authorization can be proven, for example, by means of a signature, using a private cryptographic key. The private cryptographic key can belong to an asymmetric key pair, to which also a public cryptographic key belongs, which can be used to check the signature. Moreover, a certificate substantiating the authorization to generate a valid block of the blockchain can be associated with the asymmetric key pair. This certificate can furthermore be associated with a PKI, which substantiates the authenticity of the certificate. According to a further embodiment, for example, a public key can be stored in the blockchain, for example in a genesis block, for each participant from the selected group. Based on this public key, it is possible to check whether signatures of blocks, and thus the corresponding blocks themselves, are valid.

A consensus can also be implemented in a blockchain in another manner. For example, a consensus can be achieved by voting on an inclusion of proposed entries in the blockchain. For example, each participant keeps an unambiguous list of other participants whom he or she trusts as a group. Each participant can propose additional entries to be included in an additional block of the blockchain. A vote is held about the inclusion, and thus the acknowledgment of the validity of the proposed entries. In this way, each participant, for example, votes only on the proposals stemming from participants on his or her list. In other words, only the votes of participants who are included in the list of the participant submitting the corresponding proposal are taken into consideration in the decision as to whether a proposal for an additional entry is acknowledged as being valid, that is, whether a consensus exists among the participants with regard to the validity of this entry. A certain minimum proportion of participants eligible to vote, for example 80%, has to vote yes for a proposal for an entry to be accepted as being valid. All proposed entries that meet this criterion are included in the blockchain. Such a voting process can comprise multiple rounds. All other proposals that do not meet the aforementioned criterion are discarded or again put up for a vote during the voting process for the next block of the blockchain. The aforementioned lists represent subgroups of the blockchain network whom the participant maintaining the respective list trusts as a group overall, without this requiring him or her to trust every single participant of the list. One example of such a consensus procedure is the Ripple Protocol Consensus Algorithm (David Schwartz et al.: "The Ripple Protocol Consensus Algorithm," Ripple Labs Inc., 2014, https://ripple.com/files/ripple_consensus_whitepaper.pdf).

To check the entries of the blockchain or search for hash values, a GUI, for example in the form of a website, can be provided by a management entity of the blockchain. For example, the blockchain can be a private, such as a company-internal or an association-internal, or a public blockchain. For example, it is a Bitcoin, Litecoin or Ethereum blockchain.

A "program module" here denotes an autonomous program which is stored in a blockchain. The program module can be configured to control the creation of entries associated with the program module in the blockchain. The program module can be stored in a block of the blockchain or distributed over multiple blocks of the blockchain. For example, an individual program module is associated with each issuer or each management entity of a group of issuers or all issuers together. The blockchain is a special document or certificate blockchain, for example. A program module can be a "smart contract," for example, such as is implementable in the open source Ethereum blockchain, for example.

A "program" or "program instructions" here shall be understood to mean any type of computer program, without restriction, which includes machine-readable instructions for controlling a functionality of the computer.

An "interface" here shall be understood to mean an interface via which data can be received and sent, wherein the communication interface can be configured to be equipped with contacts or in a contactless manner. The communication interface can be an internal interface or an external interface, which is connected to an associated device by means of a cable or wirelessly, for example.

Communication can take place via a network, for example. A "network" here shall be understood to mean any transmission medium having a connection for communication, in particular a local connection or a local network, in particular a local area network (LAN), a private network, in particular an Intranet, and a virtual private network (VPN). For example, a computer system can comprise a standard radio interface for connection to a WLAN. Furthermore, it can be a public network, such as the Internet. Depending on the embodiment, this connection can also be established via a mobile communication network.

A "memory" here shall be understood to mean both volatile and non-volatile electronic memories or digital storage media.

A "non-volatile memory" here shall be understood to mean an electronic memory for permanently storing data. A non-volatile memory can be configured as a non-changeable memory, which is also referred to as ready-only memory (ROM) or as a changeable memory, which is referred to simply as a non-volatile memory (NVM). In particular, this may be an EEPROM, for example a flash EEPROM, referred to as flash for short. A non-volatile memory is characterized in that the data stored therein is preserved even after the power supply is turned off.

A "volatile electronic memory" here is understood to mean a memory for temporarily storing data, which is characterized in that all the data is lost after the power supply is turned off. In particular, this may be a volatile direct access memory, which is also referred to as random access memory (RAM), or a volatile main memory of the processor.

A "protected memory area" here shall be understood to mean an area of an electronic memory to which access, that is, read access or write access, is only possible via a processor of the security module. According to embodiments, access from the processor coupled to the memory is only possible when a condition that is required to do so is met. For example, this may be a cryptographic condition, and in particular a successful authentication and/or a successful authorization verification.

A "processor" here and hereafter shall be understood to mean a logic circuit used to execute program instructions. The logic circuit can be implemented on one or more discrete components, and in particular on a chip. In particular, a "processor" shall be understood to mean a microprocessor or a microprocessor system comprising multiple processor cores and/or multiple microprocessors.

A "certificate" here shall be understood to mean a digital certificate, which is also referred to as a public key certificate. Hereafter, "digital" objects are also referred to as "virtual" objects, that is, data constructs for electronic data processing. Such certificates based on asymmetric key pairs implement what is known as a public key infrastructure (PKI). A certificate encompasses structured data used to associate a public key of an asymmetric crypto system with an identity, for example a person or a device. A certificate can include a public key and be signed, for example. As an alternative, certificates based on zero knowledge crypto systems are also possible. The certificate can, for example, correspond to the X.509 standard or another standard. For example, the certificate is a CV certificate or a Card Verifiable Certificate (CVC). An implementation of such CVCs is specified in ISO/IEC 7816-8, for example.

The PKI represents a system for issuing, distributing and checking digital certificates. In an asymmetric crypto system, a digital certificate is used to confirm the authenticity of a public key and the permissible scope of application and validity thereof. The digital certificate itself is protected by a digital signature, the genuineness of which can be checked with the public key pair of the issuer of the certificate. Again, a digital certificate is used to check the authenticity of the issuer key. In this way, it is possible to establish a chain of digital certificates, each confirming the authenticity of the public key which can be used to check the prior certificate. Such a chain of certificates forms what is known as a validation path or certification path. The participants of the PKI have to be able to rely on the genuineness of the last certificate, known as the root certificate, and of the key certified by this certificate, without any further certificate. The root certificate is managed by what is known as a root certification authority, the authenticity of all certificates of the PKI going back to the authenticity of the authority, which is presumed to be established.

In the protection of electronic communication by asymmetric cryptographic methods, digital certificates are a tried and tested means for proving authorizations. Certificates are structured data documenting the authenticity and/or further features/authorizations of the owner of a public key (signature verification key) and confirming the same through an independent, credible authority (certification service provider/CSP), in general the certification entity assigning the certificate. In general, certificates are made available to a broad group of individuals so as to allow them to check electronic signatures for authenticity and validity.

A certificate can be associated with an electronic signature when the private key belonging to the public key was used to generate the electronic signature to be checked. By a CSP providing a certificate in association with a public key to the general public, a CSP makes it possible for the users of asymmetric crypto systems to associate the public key with an identity, for example a person, an organization or an energy or computer system.

Asymmetric key pairs are used for a plurality of crypto systems and also play an important role in the signature of electronic documents. An asymmetric key pair consists of a public key, which is used to encrypt and/or decrypt data and may be passed on to third parties, such as a service provider, and a private key, which is used to encrypt and/or decrypt data and must generally be kept confidential. The public key enables anyone to encrypt data for the owner of the private key, check digital signatures of his or her documents or to authenticate him or her. A private key enables its owner to decrypt data encrypted with the public key or to create digital signatures for electronic documents. A signature created with a private key can be verified with the associated public key.

The creation of a digital signature, hereafter also referred to as "signature," is a cryptographic process during which another data value, referred to as "signature," is calculated for arbitrary data, for example an electronic document. The signature can, for example, be an encrypted hash value of the electronic document, and in particular a hash value encrypted with a private key of a cryptographic key pair associated with a certificate. The special characteristic of such a signature is that the creatorship thereof and association thereof with a particular person or authority can be checked by any third party.

A digital signature here shall also be understood to mean a digital seal, which is not associated with a natural person, but a legal entity. A digital seal is thus not used to provide a declaration of intent of an individual person, but of an institution as proof of origin. The seal can thus ensure the origin and the integrity of virtual documents and prove that these stem from a particular legal entity.

An "encrypted end-to-end connection" or an "encrypted end-to-end transmission channel" here shall be understood to mean a connection between a sender and a recipient using end-to-end encryption, in which data to be transmitted is encrypted by the sender and only encrypted by the recipient. The encryption of transmitted data thus takes place across all transmission stations so that intermediate stations, due to the encryption, cannot gain knowledge of the content of the transmitted data. The connection is cryptographically secured by the encryption, so as to prevent spying during and/or tampering with the transmission, for which purpose a so-called secure messaging process can be used. End-to-end encryption is based on two symmetric cryptographic keys, for example, wherein a first of the symmetric keys is used to encrypt messages, and a second of the symmetric keys is used to authenticate the sender of the message.

For example, a key for authenticating a sender of a message as part of a secure messaging process can be used to create a message authentication code (MAC). Using a MAC, certainty as to the origin of the message can be achieved, and the integrity thereof can be verified. MAC algorithms require two input parameters, first, the data to be protected, and secondly, a secret key. A message authentication code in the form of a checksum is calculated from both of these. The sender of a message calculates a MAC for the data of the message to be transmitted and sends the message, together with the MAC, to the recipient. The recipient calculates the MAC of the message to be received using his or her key and compares the calculated MAC to the received MAC. From the agreement of the two values, it follows that the message was sent by a party who has access to the secret key, and that the message was not altered during transmission.

According to embodiments, the registration request comprises a registration password. Checking the validity of the registration request includes checking the validity of the registration password.

Embodiments can have the advantage that the issuer is provided with a registration password for registration in the blockchain, for example by a management entity of the blockchain or of the program module or of the issuer. Using this password, and by registering in the blockchain, the issuer can obtain the authorization to store hash values using the program module. For example, the issuer is a school seeking to register so as to be able to store hash values of credentials. For this purpose, the school requests a registration password for registration from the management entity. This can take place in writing by mail, by e-mail or via a website, for example. An electronic request may be cryptographically secured. Cryptographic securing can take place, for example, by encryption with a symmetric cryptographic key and/or a public cryptographic key associated with the recipient. According to embodiments, a transmission is carried out via a connection secured by means of end-to-end encryption. Furthermore, the transmission of the request can be secured by means of suitable transport encryption, such as HTTPS. For example, the school is authenticated based on the request. In the case of an electronic request, this request may be signed, for example, with a seal, that is, a private cryptographic signature key associated with the school. In response to the request, the management entity sends the registration password to the school. Sending is carried out by mail, for example. This can serve as an additional security measure, since the mailing address of the school is publicly known and in general only changes if the school is relocated. It can thus be assumed with a high level of certainty that the recipient of the registration password sent by mail is, in fact, the school, even if, for example, the underlying request stems from an unauthorized third party, having fraudulently assumed the identity of the school. As an alternative, the registration password can be sent electronically via a communication link that is cryptographically secured as described above.

The registration password can be a one-time password, or OTP, for example. An OTP here shall be understood to mean a one-time password which is to be valid only for one-time use.

According to embodiments, the method further comprises sending the virtual document to a second computer system in response to the request for the issue of a virtual document. Embodiments can have the advantage that the virtual document is provided to a second computer system, such as a computer system of the owner of the document. The owner of the virtual document thus attains control of the document and can send this to selected further computer systems, which can check the authenticity of the virtual document based on the blockchain.

According to embodiments, the registration request also comprises an issuer ID. The issuer ID is entered into the second block of the blockchain together with the public cryptographic key if the registration password was successfully verified. Embodiments can have the advantage that the identity of the issuer can be determined from the blockchain.

An ID is an identifier comprising a feature, which is linked to a particular identify, for unambiguously identifying a person or an object, for example the issuer of the virtual document, with which the identifier is associated. An identifier can encompass numbers, letters, special characters and combinations thereof, for example. For example, the issuer ID can comprise the name of the issuer.

According to embodiments, checking the registration password comprises:
  comparing the received registration password by the first blockchain server to a registration password stored in the blockchain; and
  if the received registration password agrees with the stored registration password, confirming the validity of the received registration password by the first blockchain server.

Embodiments can have the advantage that an efficient method for determining the validity of a registration password presented by an issuer for registration is provided. According to embodiments, the registration password stored in the blockchain is generated by a management computer system of a management entity and stored in the blockchain.

According to embodiments, an annotation which indicates that the corresponding stored registration password is taken is stored in an entry of the blockchain if the received registration password agrees with the stored registration password. In this way, it can be ensured that no additional registration is possible using the same registration password. Consequently, a one-time password can be implemented in this way.

According to embodiments, the registration password is provided in the form of a signed second hash value stored in the blockchain. The comparison of the received registration password to the stored registration password comprises:
  checking the validity of the signature of the stored second hash value;
  calculating a third hash value of the received registration password; and
  comparing the calculated third hash value to the stored second hash value.

Embodiments can have the advantage that the registration password cannot be derived from the second hash value. In this way, the registration password can be kept confidential, even if the entries in the blockchain, and in particular the second hash value, are publicly accessible. Furthermore, it is possible to check based on the signature whether the registration password is provided by an authority authorized to do so.

According to embodiments, the program module comprises third program instructions. The provision of the registration password comprises:
  calculating the second hash value of the registration password by a first management computer system of a first management entity which manages the program module;
  signing the second hash value with a private cryptographic key of an asymmetric key pair associated with the first management entity;
  creating a provision request by the first management computer system, wherein the provision request includes the signed second hash value and identifies the program module;

sending the provision request by the first management computer system to a third blockchain server, which is configured to generate blocks of the blockchain;

receiving the provision request by the third blockchain server; and executing, by the third blockchain server, the third program instructions of the program module identified by the provision request, wherein the execution of the third program instructions comprises checking the signature of the second hash value by the third blockchain server, using a public cryptographic key of the asymmetric key pair associated with the first management entity, and, if the signature is valid, generating a third additional block of the blockchain by the third blockchain server, wherein the generated third block comprises a third entry associated with the program module and including the signed second hash value.

Embodiments can have the advantage that an efficient and secure method for registering one or more issuers by providing one or more second hash values for one or more registration passwords is provided.

According to embodiments, the public cryptographic key of the first management entity is stored in the blockchain, and the third blockchain server uses the public cryptographic key of the first management computer system stored in the blockchain to check the signature of the second hash value. Embodiments can have the advantage that the public cryptographic key is provided for checking the validity of the signature of second hash value by the blockchain, whereby efficient checking is made possible.

According to embodiments, an ID of the first management entity is stored in the blockchain together with the public cryptographic key of the first management entity. Embodiments can have the advantage that the identity of the management entity can be determined from the blockchain.

According to embodiments, the method further comprises sending a password request for obtaining the registration password by the first computer system to the first management computer system. The password request identifies the issuer. The method further comprises, by the first management entity, using the first management computer system:

receiving the password request;

identifying a mailing address associated with the issuer;

creating a response letter addressed to the identified mailing address, which comprises the registration password; and sending the response letter by mail.

Embodiments can have the advantage that an efficient and secure method for providing the registration password, and thus for registering issuers, is implemented. According to embodiments, the method further comprises a validity verification of the request. For example, it is checked whether the request stems from an institution, such as a university or a school, which is in fact authorized to issue corresponding documents, such as credentials.

According to embodiments, the method comprises, by the first management entity, using the first management computer system:

receiving the password request;

creating a response to the password request, which comprises the registration password; and sending the response in a cryptographically secured form to the first computer system of the issuer.

Embodiments can have the advantage that an efficient and secure method for providing the registration password, and thus for registering issuers, is implemented. According to embodiments, the method further comprises a validity verification of the request. For example, it is checked whether the request stems from an institution, such as a university or a school, which is in fact authorized to issue corresponding documents, such as credentials.

According to embodiments, the virtual document is a virtual credential.

According to embodiments, the method further comprises:

creating the program module by the second management computer system;

creating a signed initialization request by the second management computer system using the program module;

sending the initialization request by the second management computer system to a fourth blockchain server, which is configured to generate blocks of the blockchain;

receiving the program module by the fourth blockchain server; and checking the signature of the initialization request by the fourth blockchain server, using the public cryptographic key of the asymmetric key pair associated with the second management entity, and, if the signature is valid, generating a fourth additional block of the blockchain by the fourth blockchain server, wherein the generated fourth block comprises a fourth entry including the program module.

Embodiments can have the advantage that the program module for entering hash values by the issuer or issuers of virtual documents can be provided by the management computer system. This program module is provided, for example, for entering documents of an issuer or a group of issuers. According to embodiments, a plurality of program modules for entering hash values into the block chain can be provided by the management computer system.

According to embodiments, the program module comprises fourth program instructions, and the method further comprises:

receiving a first payment confirmation of a notarization fee for the issue of a virtual document by the second management computer system;

creating a first notarization confirmation by the second management computer system, wherein the notarization confirmation includes the signed first hash value of the virtual document and identifies the program module;

signing the first notarization confirmation by the second management computer system with the private cryptographic key of the management entity;

sending the signed first notarization confirmation to a fifth blockchain server, which is configured to generate blocks of the blockchain;

receiving the first notarization confirmation by the fifth blockchain server; and executing, by the fifth blockchain server, the fourth program instructions of the program module identified by the notarization confirmation, wherein the execution of the fourth program instructions comprises checking the signature of the first notarization confirmation by the fifth blockchain server, using the public cryptographic key of the second management entity, and, if the signature is valid, generating a fifth additional block of the blockchain by the fifth blockchain server, wherein the generated fifth block comprises a fifth entry associated with the program module and including the signed first notarization confirmation.

Embodiments can have the advantage that a virtual document is only considered to be notarized, and can thus in fact be used, when a confirmation has been received of the payment of a notarization fee. In this way, embodiments provide a method for efficiently ensuring that a virtual document can only be used when the corresponding fees have been paid.

According to embodiments, the user, that is, the document owner, pays the notarization fees and thus covers the cost for the additional work resulting for the issuer and management entity from adding the hash value to the blockchain and providing or managing the blockchain.

According to embodiments, the program module comprises fifth program instructions, and the method further comprises:
  generating a transaction order by the second management computer system for the transaction of at least a partial amount of the notarization fee in the form of a cryptocurrency implemented in the blockchain from a starting address, associated with the second management entity, to a destination address, associated with the issuer;
  signing the transaction order with a private cryptographic key of an asymmetric key pair associated with the starting address;
  sending the transaction order to a sixth blockchain server, which is configured to generate blocks of the blockchain;
  receiving the transaction order by the sixth blockchain server; and
  executing, by the sixth blockchain server, the fifth program instructions of the program module identified by the provision request, wherein the execution of the fifth program instructions comprises checking the signature of the transaction order by the sixth blockchain server, using the starting address, and, if the signature is valid, generating a sixth additional block of the blockchain by the sixth blockchain server, wherein the generated sixth block comprises a sixth entry associated with the program module and including the transaction order.

Embodiments can have the advantage that the blockchain provides a number system, using a cryptocurrency, such as Bitcoin or Ethereum. By way of this payment system, a method for dividing the notarization fee between the management entity and the issuer can be provided in an efficient and secure manner.

According to embodiments, the program module comprises sixth program instructions, and the method further comprises:
  receiving a second payment confirmation of the notarization fee for the issue of a virtual document by the first computer system;
  creating a second notarization confirmation by the first computer system, wherein the notarization confirmation includes the signed first hash value of the virtual document and identifies the program module;
  signing the second notarization confirmation by the first computer system using the private cryptographic key of the issuer;
  sending the signed second notarization confirmation to a seventh blockchain server, which is configured to generate blocks of the blockchain;
  receiving the second notarization confirmation by the seventh blockchain server; and
  executing, by the seventh blockchain server, the sixth program instructions of the program module identified by the second notarization confirmation, wherein the execution of the sixth program instructions comprises checking the signature of the second notarization confirmation by the seventh blockchain server, using the public cryptographic key of the issuer, and, if the signature is valid, generating a seventh additional block of the blockchain by the seventh blockchain server, wherein the generated seventh block comprises a seventh entry associated with the program module and including the signed second notarization confirmation.

Embodiments can have the advantage that a virtual document is only considered to be notarized, and can thus in fact be used, when a confirmation has been received of the payment of a notarization fee. In this way, embodiments provide a method for efficiently ensuring that a virtual document can only be used when the corresponding fees have been paid.

According to embodiments, the method further comprises:
  receiving the virtual document by a third computer system;
  calculating the first hash value of the virtual document by the third computer system;
  polling the blockchain for an entry including the first hash value of the virtual document by the third computer system; and
  if the first entry including the first hash value of the virtual document exists, without an entry including a notarization confirmation existing, confirming the existence of the virtual document.

Embodiments can have the advantage that the virtual document can be presented by the second computer system to a third computer system and efficiently checked thereby as to whether the corresponding virtual document official exists in the blockchain.

According to embodiments, the confirmation of the existence of the virtual document comprises a notice of a possible notarization as a result of payment of the notarization fee. Embodiments can have the advantage that an efficient method for paying a notarization fee can thus be provided. If needed, the corresponding fee can be paid either by the document owner or a recipient of the virtual document requiring a notarization.

According to embodiments, the method, if the entry including the first hash value of the virtual document exists and an entry including a notarization confirmation for the first hash value exist, further comprises confirming the notarization of the virtual document. Embodiments can have the advantage that a method for efficiently notarizing virtual documents is provided. This can enable anyone who has the corresponding virtual document on hand to verify the genuineness of digital or virtual documents. If the hash value of the virtual document agrees with a notarized hash value stored in the blockchain, it follows that the virtual document is an authentic document.

Embodiments further comprise a system comprising a first computer system associated with an issuer, which is configured to carry out a method according to any one of the above-described embodiments.

According to embodiments, the system further comprises a first management computer system, which is associated with a first management entity and configured to carry out a method according to any one of the above-described embodiments.

According to embodiments, the system further comprises a second management computer system, which is associated with a second management entity and configured to carry out a method according to any one of the above-described embodiments.

According to embodiments, the system further comprises a third computer system, which is configured to carry out a method according to any one of the above-described embodiments.

According to embodiments, the system further comprises at least one blockchain server, which is configured to carry out a method according to any one of the above-described embodiments.

Here, ordinal numbers such as first, second, third, and so forth, are solely used to distinguish elements that are different from one another, and shall not be construed to imply a particular sequence, unless a meaning to the contrary follows from the specific context.

According to embodiments, all or some of the aforementioned blockchain servers, that is, the first to seventh blockchain servers, can be one and the same or different blockchain servers According to embodiments, the aforementioned first and second management computer systems of the first or second management entity can be different or one and the same management computer system of different or one and the same management entity. For example, the first management entity is a management entity of the issuer, which manages the issuer and/or a group of issuers. For example, the first and/or second management authorities are a management entity of the program module and/or of the blockchain which manages the program module and/or the blockchain.

Embodiments of the invention will be described in more detail hereafter with reference to the drawings. In the drawings.

Elements of the following embodiments that correspond to each other are denoted by the same reference numerals.

Figure 1A:
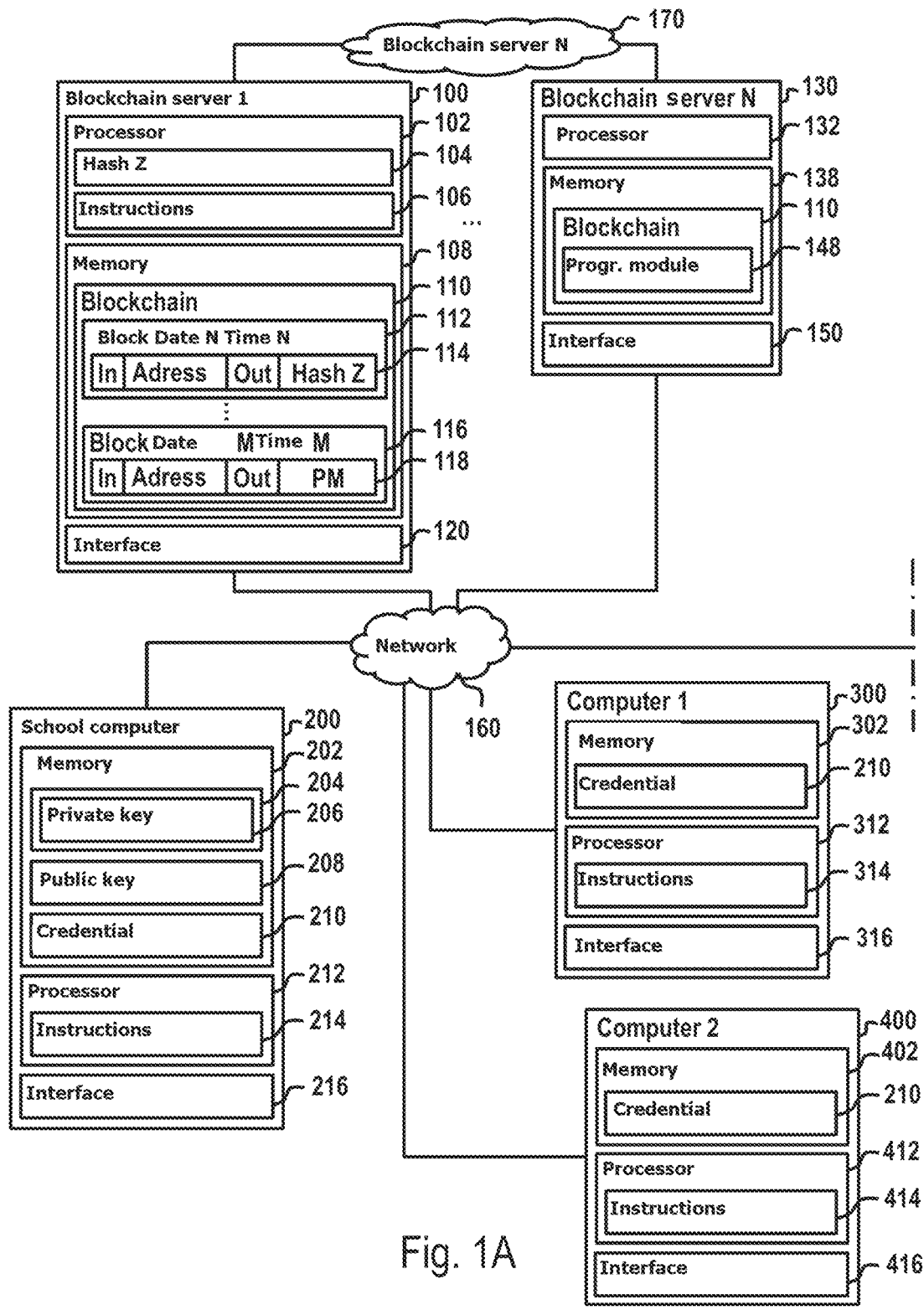
FIGS. 1A and 1B show schematic block diagrams of a first embodiment of an exemplary system for issuing a virtual document.
Figure 1B:
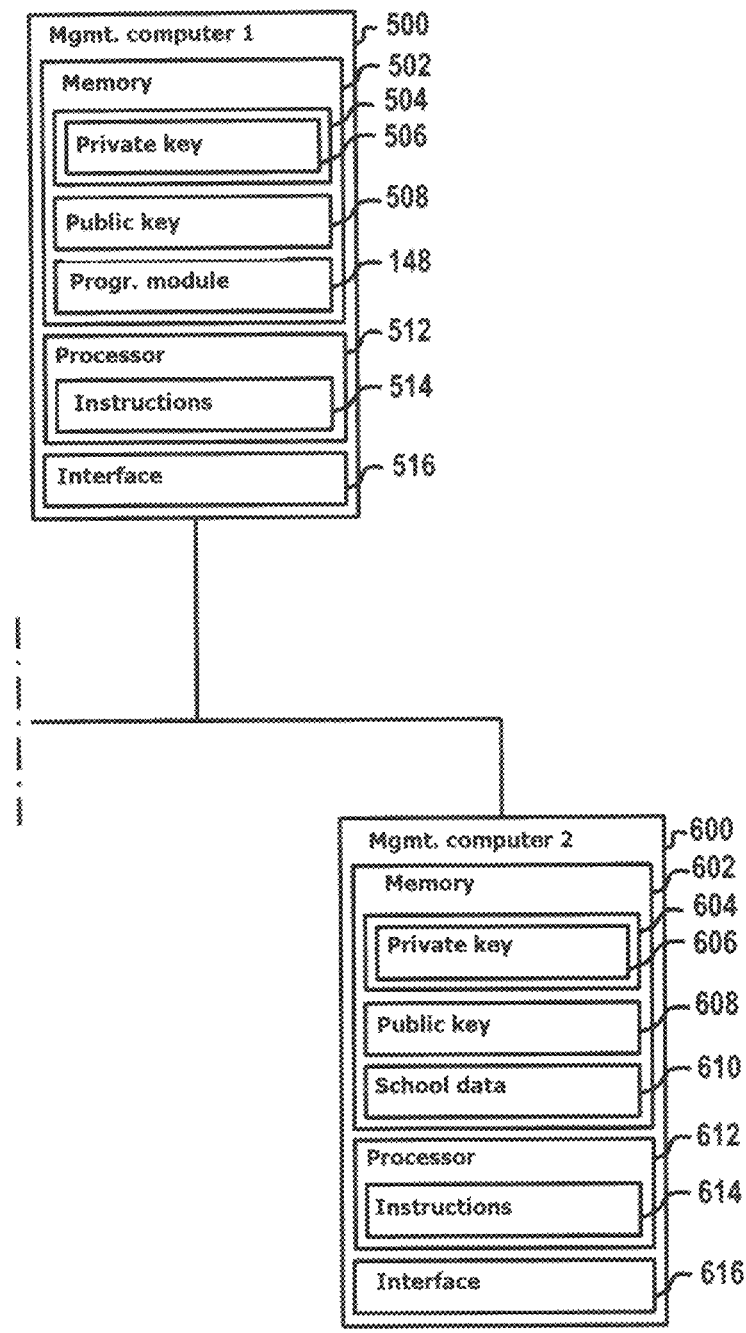

FIGS. 1A and 1B show schematic block diagrams of a first embodiment of an exemplary system for issuing a virtual document. The virtual document is a virtual credential 210, for example, and the issuer is a school, for example. The credential 210 is generated by the school computer system 200 by the execution of program instructions 214 and stored in the memory 202 of the school computer system 200. The program instructions 214 are executed by a processor of the school computer system 200. Furthermore, the memory 202 of the school computer system 200 comprises a protected memory area 204 including a private cryptographic key 206 of an asymmetrical key pair, which is associated with the school as the issuer of credentials, such as the credential 210 associated with the credential 210. Moreover, the memory 202 comprises a public cryptographic key 208. The school computer system 200 uses the private cryptographic key 206, for example, to sign data objects, such as a hash value 104 of the credential 210, so as to prove the authenticity thereof. Finally, the school computer system 200 comprises a communication interface for communicating via the network 160. The network 160 is the Internet, for example. In addition or as an alternative to a signature with the private cryptographic key of the sender, the communication via the network 160 can be cryptographically secured, for example, by encrypting the transmitted data with a symmetric cryptographic key and/or a public cryptographic key associated with the recipient. For example, a symmetric key is used, which is calculated using a pseudo random number. The distribution of the symmetric cryptographic key can be secured, for example, in the form of a hybrid encryption pattern, using an asymmetric key pair. Hybrid encryption encompasses a combination of asymmetric encryption and symmetric encryption. The sender selects a random symmetric key, for example a pseudo random number, referred to as a session key. This session key is used to symmetrically encrypt the data to be protected. The session key is asymmetrically encrypted with the public key of the recipient. This procedure can combine the advantage of secure key distribution, using asymmetric keys, with the advantageous speed of symmetric encryption. According to embodiments, a transmission is carried out via a connection secured by means of end-to-end encryption. Furthermore, the transmission can be secured, for example, by means of suitable transport encryption, such as HTTPS.

The school computer system 200 further calculates a hash value 104 of the credential 210 and sends this via the network 160 to one of the blockchain servers 100, 130 of the blockchain network 170. For calculating the hash value, the school computer system 200 can resort to a dedicated hash algorithm, for example, which is included in the program instructions 214, or a hash algorithm provided by the blockchain server 100. According to embodiments, the blockchain network 170 comprises a blockchain server 100, and according to further embodiments, the blockchain network 170 comprises a plurality of blockchain servers 100, 130. According to embodiments, the network 160 comprises the blockchain network 170.

The blockchain server 100, in the memory 108 thereof, comprises the blockchain 110. The blockchain 110 comprises a plurality of blocks 112, 116. According to embodiments, the blocks 112, 116 each comprise time information indicating the point in time at which the corresponding block 112, 116 was created. For example, the time information includes a date and a time. According to embodiments, the blocks 112, 116 each comprise one or more entries 114, 118. For example, the entries 114, 118 each comprise an address identifying the entry in the blockchain. The entries 114, 118 can furthermore be designed as transactions, for example, and can each specify a starting address In and a destination address Out of the corresponding transaction. The entry 118 further comprises the program module (PM) 148, which comprises program instructions. As a result of the execution of these program instructions, entries 114 associated with the program module 148 are created in the blockchain 110, or corresponding entries 114 are retrieved and evaluated. According to embodiments, the program module 148 can also be stored distributed over multiple entries 118. As a result of an execution of the program instructions of the program module 148 by the processor 102, the hash 104 of the credential 210 is stored in the entry 114 of the blockchain 110, for example. As a result of an execution of the program instructions, furthermore the school computer system 200 and/or a management computer system 600 of a management entity, such as a school authority or an association, can be registered. A registration comprises, for example, a creation of an entry in the blockchain with a public cryptographic key of an asymmetric key pair, which is associated with the corresponding computer system 200, 600. Furthermore, registration passwords for the corresponding registrations in the blockchain can be stored by an execution of the program instructions. By an execution of the program instructions, the entry of the hash 104 can also be notarized, and fees paid for the notarization can be distributed among the involved parties via transactions. Finally, the authenticity of a credential 210 can be checked by comparing a hash value calculated for the credential to the hash value 104 stored in the blockchain. If these agree, the credential 210 is authentic.

The blockchain server 100 further comprises program instructions 106, which control, for example, the communication via the network 160 and/or the blockchain network 170 by means of a communication interface 120. Furthermore, the program instructions 106 control the storage and retrieval of the blockchain 110, for example. Furthermore, the blockchain server 100 comprises an asymmetric key pair (not shown), for example, for signing data and/or encrypting data.

The further blockchain servers 130 of the blockchain network 170 likewise comprise processors 132, memories 138 including the blockchain and the program module 148, and communication interfaces 150. Furthermore, the blockchain servers 130 comprise a respective asymmetric key pair (not shown), for example, for signing data and/or encrypting data.

The computer system 300 is a computer system of an owner of the credential 210, for example. The virtual credential 210 is sent to the computer system 300 by the school computer system 200 via the network 160. A processor 312 of the computer system 300 is configured, for example, to execute program instructions 314. An execution of the program instructions 314 controls the reception and/or forwarding of the credential 210, for example. The computer system 300 stores the received credential 210 in the memory 302, for example. For communicating via the network 160, the computer system 300 comprises a communication interface 316. Furthermore, the computer system 300 comprises an asymmetric key pair (not shown), for example, for signing data and/or encrypting data.

The computer system 400 is a computer system of a recipient of the credential 210, for example. The recipient of the credential 210 can be a potential employer of the credential owner, for example, to which the credential owner wants to apply with the credential 210. The virtual credential 210 is sent to the computer system 400 by the computer system 300 via the network 160. A processor 412 of the computer system 300 is configured, for example, to execute program instructions 414. An execution of the program instructions 414 controls the reception of the credential 210, for example. The computer system 400 stores the received credential 210 in the memory 402, for example. For communicating via the network 160, the computer system 400 comprises a communication interface 346. Furthermore, the computer system 400 comprises an asymmetric key pair (not shown), for example, for signing data and/or encrypting data.

A result of an execution of the program instructions 414, furthermore a hash value of the credential 210 can be calculated and compared to the hash value 104 stored in the blockchain 110. If the two hash values agree, the credential 210 transmitted by the credential owner is an authentic credential. For the calculation of the hash value, the computer system 400 can resort to a dedicated hash algorithm, for example, which is included in the program instructions 414, or a hash algorithm provided by the blockchain server 100.

The management computer system 500 is, for example, a computer system of a management entity of the blockchain 110 or of the program module 148. For example, this is a provider of the blockchain 110 or of the program module 148. A processor 512 of the management computer system 500 is configured to execute program instructions 514. A result of an execution of the program instructions 514, for example, the program module 148 is created and transmitted via the network 160 to blockchain servers for entry into the blockchain 110. For communicating via the network 160, the management computer system 500 comprises a communication interface 516. Furthermore, the memory 502 comprises a public cryptographic key 508 of an asymmetric key pair associated with the provider. Moreover, the management computer system 500 can have a private cryptographic key 504 of the asymmetric key pair stored in a protected memory area 604. The private cryptographic key 504 can be used to sign the program module 148, for example, wherein the resulting signature can be checked with the public cryptographic key 508. On the one hand, the signature can serve as proof of the authenticity of the program module 148, and on the other hand, the signature can serve as proof of authority of the management computer system 500 for entering the program module into the block chain 110.

Furthermore, a management computer system 600 of a management entity, such as a school authority or an association, can be provided. For example, data 610 of the school comprising the school computer system 200, such as the address thereof, is stored in a memory 602 of the management computer system 600. Furthermore, the memory 602 comprises a public cryptographic key 608 of an asymmetric key pair associated with the management entity. Moreover, the management computer system 600 can have a private cryptographic key 604 of the asymmetric key pair stored in a protected memory area 604. A processor 612 of the management computer system 600 is configured to execute program instructions 614. A result of an execution of the program instructions 614, for example, a registration password is provided for registering the school computer system 200 in an entry of the blockchain 110. The private cryptographic key 604 can be used to sign the registration password, for example, wherein the resulting signature can be checked using the public cryptographic key 608. Furthermore, the corresponding registration password is provided to the school computer system 200 for registering. Finally, the management computer system 600 comprises a communication interface 616 for communicating via the network 160.

Figure 2:
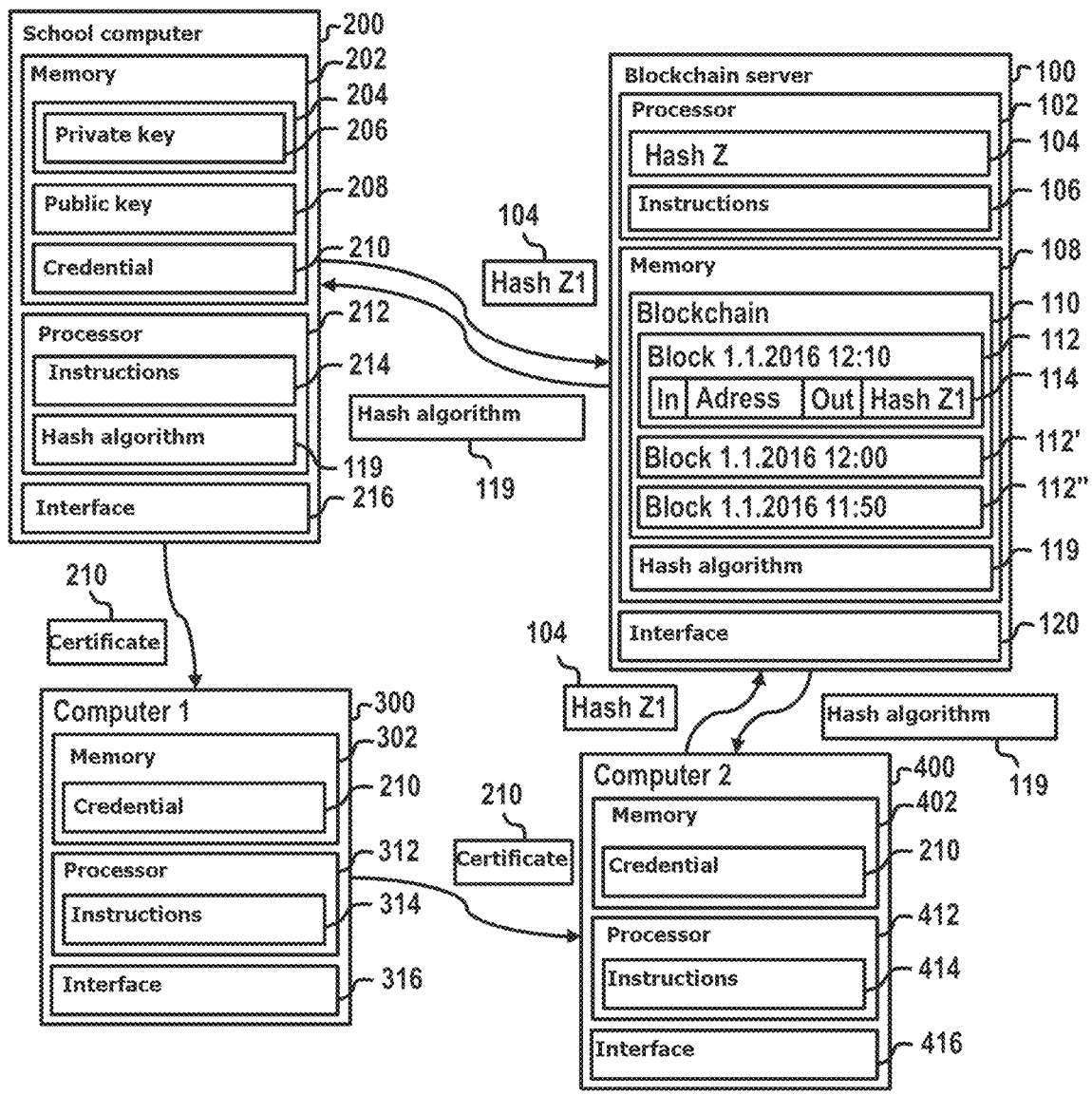
FIG. 2 shows a schematic block diagram of a second embodiment of an exemplary system for issuing a virtual document.

FIG. 2 shows a block diagram of a second embodiment of an exemplary system for issuing a virtual document 210. The shown computer systems, that is, the school computer system 200, the blockchain server 100, the computer system 300 and the computer system 400, are designed analogously to the corresponding computer systems from FIG. 1A. FIG. 2 illustrates the communication between the computer systems in greater detail. The school computer system 200 generates a virtual document in the form of the credential 210. A hash value 104 is calculated for the created credential

210. For this purpose, for example, a hash algorithm 119 provided by the blockchain server 100 is invoked by the school computer system 200 in a browser. The calculated hash value 104 is transmitted to the blockchain server 100 and entered by the same into an entry 114 of an additional block 112 of the blockchain 110.

The created credential 210 is sent to the computer system 300 of the credential owner by the school computer system 200. The credential owner forwards, for example, the credential 210 to a computer system 400. If the computer system 400 wants to check the credential 210 received from the computer system 300 of the credential owner for the authenticity thereof, the computer system 400 calculates the hash value 104 using a hash algorithm 119 provided by the blockchain server 100, and compares this to the hash value stored in the entry 114 of the blockchain 110. If the two hash values agree, the presented credential 210 is an authentic document.

Figure 3:
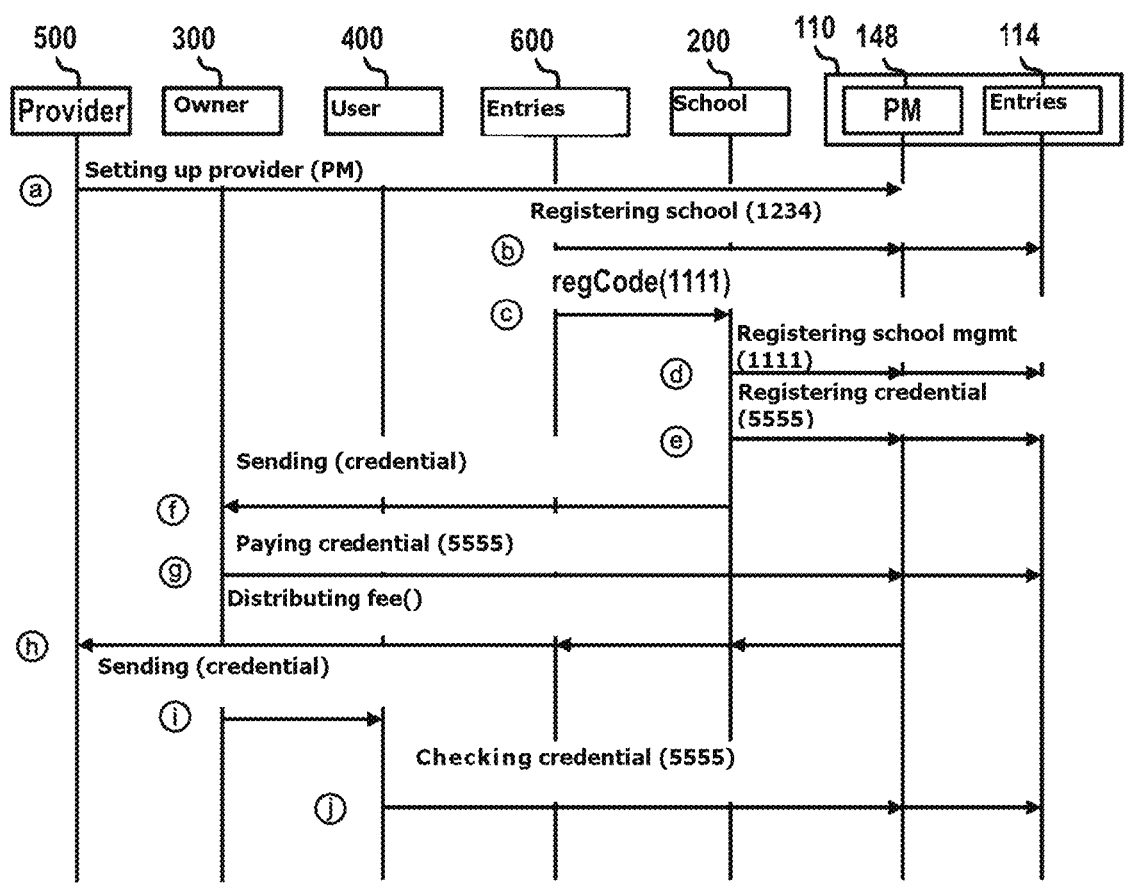
FIG. 3 shows a schematic UML diagram of an embodiment of an exemplary method for issuing a virtual document.

FIG. 3 shows a UML diagram of an embodiment of an exemplary method for issuing a virtual document 210. In step (a), the provider 500 generates a program module 148, which is stored in the blockchain 110. In step (b), a management entity 600, such as a school authority or an association, registers using a registration password 1234. The management entity 600 receives the corresponding registration password from the provider 500 on request by mail, for example. In the course of the registration, a public cryptographic key associated with the management entity 600 is stored in an entry 114 of the blockchain 110, for example. Based on this public cryptographic key, it is possible to check signatures of the management entity 600, which were created with a private cryptographic key associated with the public cryptographic key. When entries are made into the blockchain in the form of transactions having starting and destination addresses, this public cryptographic key can additionally serve as the receiving address of the management entity 600. In step (c), a registration password 1111 is sent to the school 200, which reports to the management entity 600, for registering the school 200 in the blockchain 110 by means of the program module 148. This can be carried out by mail, for example, to increase security. In step (d), the school registers via the program module 148 in the blockchain 110 using the registration password 1111 received from the management entity 600. For example, an entry 114 including a public cryptographic key is generated in the blockchain 110 in the process. Based on this public cryptographic key, it is possible to check signatures of the school 200, which were created with a private cryptographic key associated with the public cryptographic key. When entries are made to the blockchain in the form of transactions having starting and destination addresses, this public cryptographic key can additionally serve as the receiving address of the school 200. After registration, the school 200 is able to register credentials. For this purpose, in step (e), a hash value 5555 is calculated for the credential, and the credential is registered with this hash value 5555 in an entry 114 of the blockchain 110 using the program module 148. Since the school 200 is registered, the entry is accepted. With this registration, however, the credential is not yet notarized. In step (f), the credential is moreover sent from the school to the credential owner 300. For example, an arbitrary user 300, 400, 600, 200 can check the status of the credential. For example, this user receives the answer: the credential can be notarized. The credential owner 300, for example, remits the notarization fee, such as 5 euros, to the provider 500. According to alternative embodiments, the remittance can also be made to the school 200 or the management entity 600. The remittance can be carried out via the blockchain, for example, if the blockchain provides an option for transactions of a cryptocurrency. As an alternative, the remittance of the notarization fee can also be carried out via a conventional checking account, provided by the provider 500, for example. The remittance mentions the hash 5555 in the reference line, for example. A script at the provider 500 checks the receipt of fees and, in step (g), changes the status of the credential in the blockchain 110 from registered to paid, that is, notarized. A notarization confirmation is stored in an entry 114 of the blockchain 110 in the process. From this point in time, a user checking the status of the credential receives the response that the credential has been notarized. In step (h), the received notarization fee is distributed among the school 200, the management entity 600 and the provider 500, for example according to a predefined key. This can take place, for example, by means of transactions, using the blockchain 110. In step (i), the credential owner 300 sends to the user 400, for example. This user, in step (j), can check the status of the credential by calculating the hash value thereof and comparing the calculated hash value to the hash value stored in an entry 114 of the blockchain 110, using the program module 148. If the two hash values agree, the user receives the information the credential is authentic and has been notarized.

Figure 4:
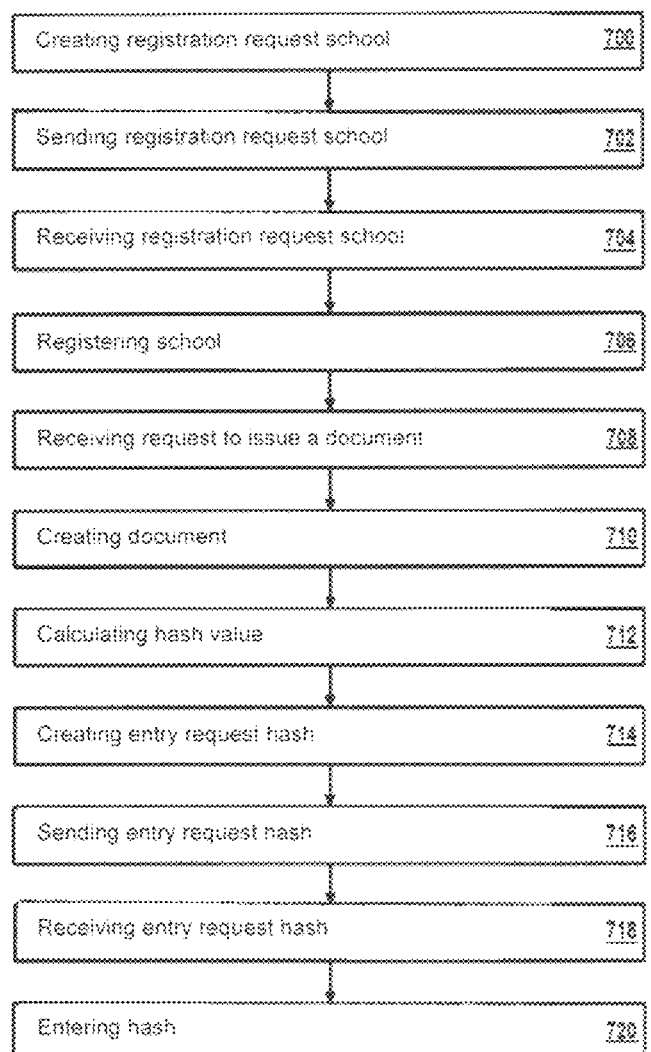
FIG. 4 shows a schematic flow chart of an embodiment of an exemplary method for issuing a virtual document.

FIG. 4 shows a flow chart of an embodiment of an exemplary method for issuing a virtual document. In block 700, a registration request is created by the school to a blockchain server. In block 702, the registration request is sent to the blockchain server. In block 704, the blockchain server receives the registration request and checks the validity of the registration request, using a program module provided by the blockchain. For example, the school registers using a registration password. The registration request is valid, for example, when the registration password is valid. In response to a valid registration request, the school is registered by the program module in the blockchain in block 706. For example, a public cryptographic key of the school is stored in the blockchain in the process. In block 708, the school receives a request to issue a document, such as a credential. In block 710, the school creates the credential. In block 712, the school calculates a hash value of the created document. In block 714, an entry request for entering the hash value in the blockchain is created. In block 716, the entry request is sent from the school to a blockchain server, which receives the entry request in block 718. If the entry request is valid, which, for example, comprises a valid signature with a private cryptographic key of the school, the hash value is entered into the block in block 720, and the credential has thus been registered. The registered credential can then be transmitted from the school to the credential owner, for example.

Figure 5:
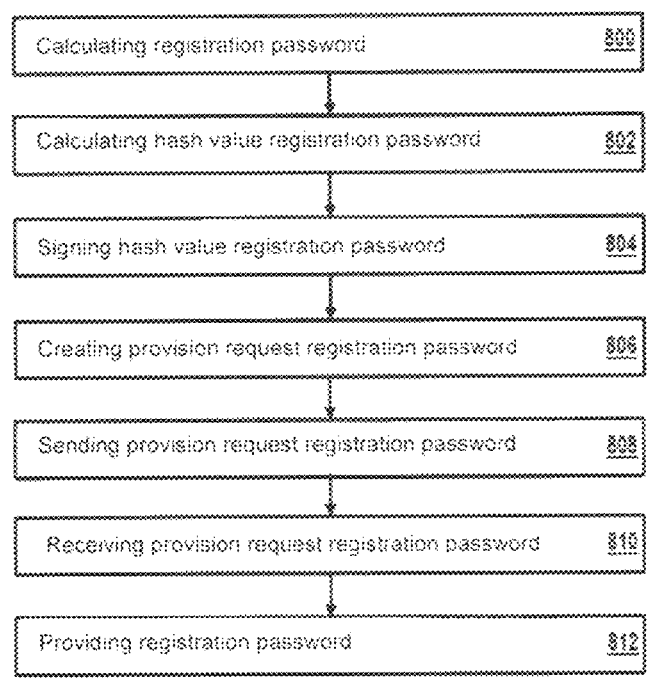
FIG. 5 shows a schematic flow chart of an embodiment of an exemplary method for providing a registration password.

FIG. 5 shows a flow chart of an embodiment of an exemplary method for providing a registration password. In block 800, a registration password is calculated by a management entity, which is in charge of the school, or a provider of the blockchain or of the program module. In block 802, a hash value of the registration password is calculated. In block 804, the hash value is encrypted with a private cryptographic key of the management entity or of the provider. In block 806, a provision request is created and sent to a blockchain server in block 808. The blockchain server receives the provision request in block 810, and, in block 812, stores the registration password in an entry of the blockchain, using the program module, if the provision request is valid. The provision request is valid, for example, if the management entity or the provider of the program module is registered, that is, an entry of the blockchain associated with the program module comprises a public cryptographic key of the management entity or of the provider, and the provision request comprises a signature with a private cryptographic key associated with the public cryptographic key.

Figure 6:
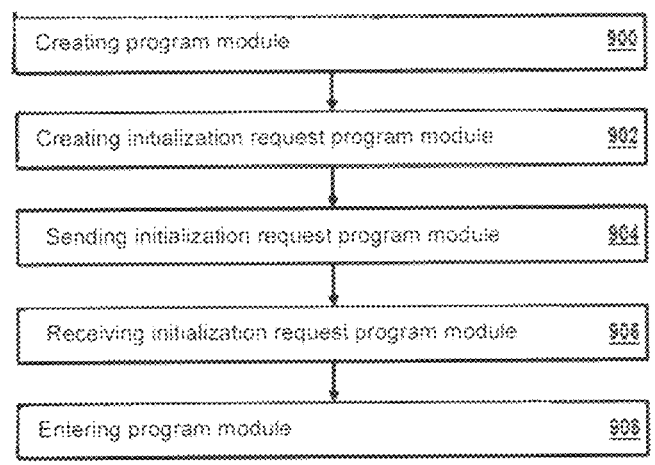
FIG. 6 shows a schematic flow chart of an embodiment of an exemplary method for providing a program module.

FIG. 6 shows a flow chart of an embodiment of an exemplary method for providing a program module. In block 900, a program module is created by a provider. In block 902, an initialization request is created for the program module and sent to a blockchain server in block 904. In block 906, the initialization request is received and, in block 908, is entered into the blockchain. According to exemplary embodiments, the entry is carried out if the initialization request comprises a signature of the provider.

Figure 7:
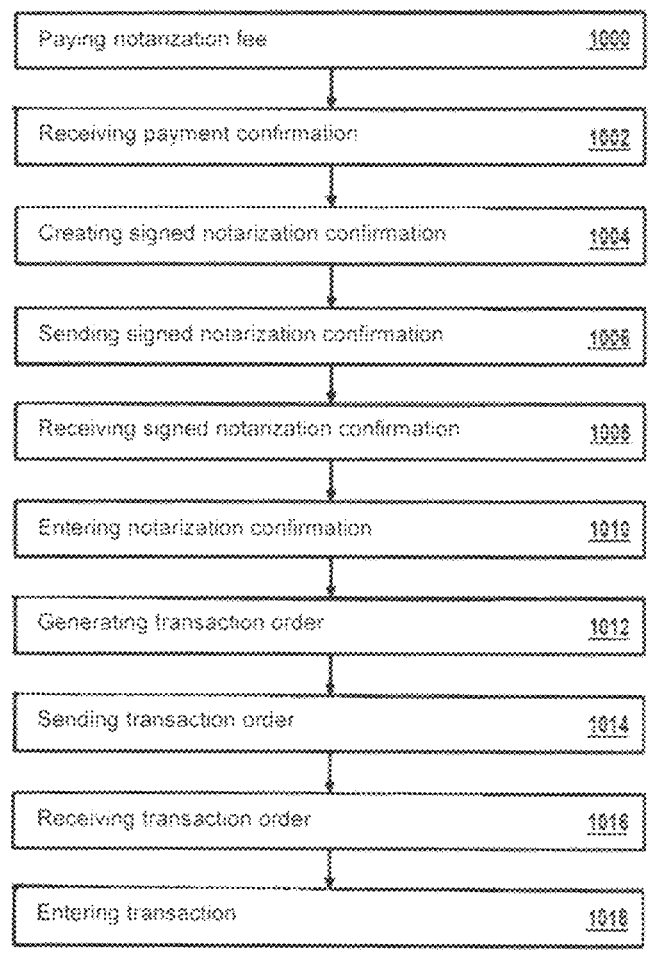
FIG. 7 shows a schematic flow chart of an embodiment of an exemplary method for notarizing a virtual document.

FIG. 7 shows a flow chart of an embodiment of an exemplary method for notarizing a virtual document. In block 1000, a notarization fee is paid for a credential entered into the blockchain. This can take place, for example, using a cryptocurrency or in the conventional manner by way of remittance, credit card payment or via a payment service such as PayPal®. In block 1002, the provider receives a payment confirmation for the notarization fee, for example. Thereupon, the provider creates a signed notarized confirmation in block 1004, which the provider sends to a blockchain server in block 1006. In block 1008, the blockchain server receives the notarization confirmation and, in block 1010, enters it into the blockchain, using the program module. According to embodiments, the entry is carried out if the signature of the notarization confirmation is valid. In block 1012, furthermore one or more transaction orders are generated, with which portions of the notarization fee are remitted to the school which issued the credential, and optionally to a management entity in charge of the school, using a cryptocurrency, for example according to a predefined distribution key. In block 1014, the transaction order is sent from the provider to a blockchain server and received by the same in block 1016. If the transaction order is valid, that is, comprises a signature of the provider, for example, and the provider is authorized to remit the indicated amounts, an entry of the transactions into the blockchain is carried out in block 1018.

Figure 8:
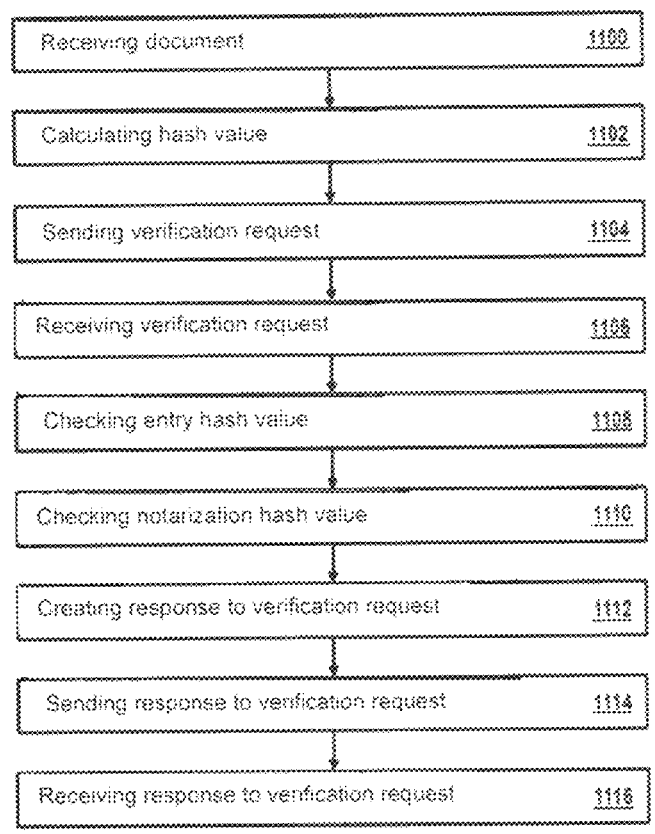
FIG. 8 shows a schematic flow chart of an embodiment of an exemplary method for verifying the genuineness of a virtual document.

FIG. 8 shows a flow chart of an embodiment of an exemplary method for verifying the genuineness of a virtual document. In block 1100, the virtual credential is received by a user. The user is a potential future employer, for example, to which the credential owner is applying. So as to check the validity of the presented credential, the user calculates a hash value of the credential in block 1102. In block 1104, a verification request is sent with the hash value to a blockchain server, which receives the verification request in block 1106. In block 1108, it is checked, using the program module, whether the calculated hash value is entered in the blockchain of the credential. Additionally, it is checked in step 1110 whether the credential is also notarized, that is, whether an annotation exists with respect to the payment of the notarization fees. Based on the verification results, a response is created to the verification request in block 1112 and sent from the blockchain server to the user in block 1114. In block 1116, the user receives the response. If the credential has been entered and notarized, the response will inform the user accordingly.

LIST OF REFERENCE NUMERALS 100 blockchain server
102 processor
104 hash value
106 program instructions
108 memory
110 blockchain
112 block
114 entry
116 block
118 entry
119 hash algorithm
120 communication interface
130 blockchain server
132 processor
138 memory
148 program module
150 communication interface
160 network
170 blockchain network
200 school computer system
202 memory
204 protected memory area
206 private key
208 public key
210 credential
212 processor
214 program instructions
216 communication interface
300 computer system (credential owner)
302 memory
312 processor
314 program instructions
316 communication interface
400 computer system (credential recipient)
402 memory
412 processor
414 program instructions
416 communication interface
500 management computer system (blockchain)
502 memory
504 protected memory area
506 private key
508 public key
512 processor
514 program instructions
516 communication interface
600 management computer system (schools)
602 memory
604 protected memory area
606 private key
608 public key
612 processor
614 program instructions

The invention claimed is:

1. A method for issuing a virtual document by means of a first computer system of an issuer, the first computer system comprising a memory, a public cryptographic key of an asymmetric key pair associated with the issuer being stored in the memory, a private cryptographic key of the asymmetric key pair of the issuer being stored in a protected memory area of the memory, the first computer system comprising a communication interface for communicating via a network, the virtual document being issued using a blockchain, the blockchain in a block comprising a program module including first and second program instructions, entries associated with the program module being generated in the blockchain as a result of the execution of the program instructions, the method comprising:
creating a registration request by the first computer system, wherein the registration request includes the public cryptographic key of the issuer and identifies the program module;
sending the registration request by the first computer system via the network to a first blockchain server, wherein the first blockchain server is configured to generate blocks of the blockchain;
receiving the registration request by the first blockchain server;
executing, by the first blockchain server, the first program instructions of the program module identified by the registration request, wherein the execution of the first program instructions comprises checking the validity of the registration request and, if the registration request is valid, generating a first additional block of the blockchain for the registration of the public cryptographic key of the issuer, wherein the generated first block comprises a first entry associated with the program module and including the public cryptographic key of the issuer;
receiving a request by the first computer system for the issue of a virtual document;
creating a virtual document by the first computer system;
calculating a first hash value of the virtual document by the first computer system;
creating, by the first computer system, an entry request signed with the private cryptographic key of the issuer, wherein the entry request includes the first hash value and identifies the program module;
sending the signed entry request by the first computer system via the network to a second blockchain server, which is configured to generate blocks of the blockchain;
receiving the signed entry request by the second blockchain server;
executing, by the second blockchain server, the second program instructions of the program module identified by the signed entry request, wherein the execution of the second program instructions comprises checking the signature of the entry request, using the public cryptographic key of the issuer registered in the blockchain, and, if the signature is valid, generating a second additional block of the blockchain for the issue of a virtual document, wherein the generated second block comprises a second entry associated with the program module and including the first hash value.

2. The method according to claim 1, wherein the registration request comprises a registration password, and wherein checking the validity of the registration request comprises checking the validity of the registration password.

3. The method according to claim 1, the method further comprising:
sending the virtual document to a second computer system in response to the request for the issue of a virtual document.

4. The method according to claim 1, wherein the registration request moreover comprises an issuer ID, which is entered into the second block of the blockchain together with the public cryptographic key if the registration password was checked successfully.

5. The method according to claim 1, the checking of the registration password comprising:
comparing the received registration password by the first blockchain server to a registration password stored in the blockchain; and
if the received registration password agrees with the stored registration password, confirming the validity of the received registration password by the first blockchain server.

6. The method according to claim 1, wherein the registration password is provided in the form of a signed second hash value stored in the blockchain, the comparison of the received registration password to the stored registration password comprising:
checking the validity of the signature of the stored second hash value;
calculating a third hash value of the received registration password; and
comparing the calculated third hash value to the stored second hash value.

7. The method according to claim 6, wherein the program module comprises third program instructions, the provision of the registration password comprising:
calculating the second hash value of the registration password by a first management computer system of a first management entity;
signing the second hash value with a private cryptographic key of an asymmetric key pair associated with the first management entity;
creating a provision request by the first management computer system, wherein the provision request includes the signed second hash value and identifies the program module;
sending the provision request by the first management computer system to a third blockchain server, which is configured to generate blocks of the blockchain;
receiving the provision request by the third blockchain server; and
executing, by the third blockchain server, the third program instructions of the program module identified by the provision request, wherein the execution of the third program instructions comprises checking the signature of the second hash value by the third blockchain server, using a public cryptographic key of the asymmetric key pair associated with the first management entity, and, if the signature is valid, generating a third additional block of the blockchain by the third blockchain server, wherein the generated third block comprises a third entry associated with the program module and including the signed second hash value.

8. The method according to claim 7, wherein the public cryptographic key of the first management entity is stored in the blockchain, and the third blockchain server uses the public cryptographic key of the first management computer system stored in the blockchain for checking the signature of the second hash value.

9. The method according to claim 7, the method further comprising:
sending a password request for receiving the registration password by the first computer system to the first management computer system, the password request identifying the issuer;
the method further comprising, by the first management entity, using the first management computer system:
receiving the password request;

identifying a mailing address associated with the issuer;
creating a response letter addressed to the identified mailing address, which comprises the registration password; and
sending the response letter by mail.

10. The method according claim 7, the method further comprising:
sending a password request for receiving the registration password by the first computer system to the first management computer system, the password request identifying the issuer;
the method further comprising, by the first management entity, using the first management computer system:
receiving the password request;
creating a response to the password request, which comprises the registration password; and
sending the response in cryptographically secured form to the first computer system of the issuer.

11. The method according claim 1, wherein the virtual document is a virtual credential.

12. The method according to claim 1, the method further comprising:
creating the program module by a second management computer system of a second management entity;
creating a signed initialization request by the second management computer system with the program module;
sending the initialization request by the second management computer system to a fourth blockchain server, which is configured to generate blocks of the blockchain;
receiving the program module by the fourth blockchain server;
checking the signature of the initialization request by the fourth blockchain server using the public cryptographic key of the asymmetric key pair associated with the second management entity, and, if the signature is valid, generating a fourth additional block of the blockchain by the fourth blockchain server, wherein the generated fourth block comprises a fourth entry including the program module.

13. The method according to claim 1, wherein the program module comprises fourth program instructions, the method further comprising:
receiving a first payment confirmation of a notarization fee for the issue of a virtual document by the second management computer system;
creating a first notarization confirmation by the second management computer system, wherein the notarization confirmation includes the signed first hash value of the virtual document and identifies the program module;
signing the first notarization confirmation by the second management computer system with the private cryptographic key of the second management entity;
sending the signed first notarization confirmation to a fifth blockchain server, which is configured to generate blocks of the blockchain;
receiving the first notarization confirmation by the fifth blockchain server; and
executing, by the fifth blockchain server, the fourth program instructions of the program module identified by the notarization confirmation, wherein the execution of the fourth program instructions comprises checking the signature of the first notarization confirmation by the fifth blockchain server, using the public cryptographic key of the second management entity, and, if the signature is valid, generating a fifth additional block of the blockchain by the fifth blockchain server, wherein the generated fifth block comprises a fifth entry associated with the program module and including the signed first notarization confirmation.

14. The method according to claim 13, wherein the program module comprises fifth program instructions, the method further comprising:
generating a transaction order by the second management computer system for the transaction of at least a partial amount of the notarization fee in the form of a cryptocurrency implemented in the blockchain from a starting address, associated with the second management entity, to a destination address, associated with the issuer;
signing the transaction order with a private cryptographic key of an asymmetric key pair associated with the starting address;
sending the transaction order to a sixth blockchain server, which is configured to generate blocks of the blockchain;
receiving the transaction order by the sixth blockchain server; and
executing, by the sixth blockchain server, the fifth program instructions of the program module identified by the provision request, wherein the execution of the fifth program instructions comprises checking the signature of the transaction order by the sixth blockchain server, using the starting address, and, if the signature is valid, generating a sixth additional block of the blockchain by the sixth blockchain server, wherein the generated sixth block comprises a sixth entry associated with the program module and including the transaction order.

15. The method according to claim 1, wherein the program module comprises sixth program instructions, the method further comprising:
receiving a second payment confirmation of the notarization fee for the issue of the virtual document by the first computer system;
creating a second notarization confirmation by the first computer system, wherein the notarization confirmation includes the signed first hash value of the virtual docuinent and identifies the program module;
signing the second notarization confirmation by the first computer system with the private cryptographic key of the issuer;
sending the signed second notarization confirmation to a seventh blockchain server, which is configured to generate blocks of the blockchain;
receiving the second notarization confirmation by the seventh blockchain server; and
executing, by the seventh blockchain server, the sixth program instructions of the program module identified by the second notarization confirmation, wherein the execution of the sixth program instructions comprises checking the signature of the second notarization confirmation by the seventh blockchain server, using the public cryptographic key of the issuer, and, if the signature is valid, generating a seventh additional block of the blockchain by the seventh blockchain server, wherein the generated seventh block comprises a seventh entry associated with the program module and including the signed second notarization confirmation.

16. The method according to claim 1, the method further comprising:
receiving the virtual document by a third computer system;

calculating the first hash value of the virtual document by the third computer system;

polling the blockchain for an entry including the first hash value of the virtual document by the third computer system; and if the first entry including the first hash value of the virtual document exists, without an entry including a notarization confirmation existing, confirming the existence of the virtual document.

17. The method according to claim 16, wherein the confirmation of the existence of the virtual document comprises a notice of a possible notarization by payment of the notarization fee.

18. The method according to claim 16, the method further comprising:

if the entry including the first hash value of the virtual document exists and an entry including a notarization confirmation for the first hash value exists, confirming the notarization of the virtual document.

19. A system, comprising a first computer system associated with an issuer, which is configured to carry out a method according to claim 1.

\* \* \* \* \*